United States Patent [19]
Brown et al.

[11] Patent Number: 6,061,654
[45] Date of Patent: *May 9, 2000

[54] SYSTEM AND METHOD OF RECOGNIZING LETTERS AND NUMBERS BY EITHER SPEECH OR TOUCH TONE RECOGNITION UTILIZING CONSTRAINED CONFUSION MATRICES

[75] Inventors: Deborah W. Brown, Manalapan; Randy G. Goldberg, Princeton; Piyush C. Modi, Flemington; Richard R. Rosinski; Richard M. Sachs, both of Middletown, all of N.J.

[73] Assignee: AT&T Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/771,356

[22] Filed: Dec. 16, 1996

[51] Int. Cl.[7] .................................................. G10L 9/06
[52] U.S. Cl. .......................... 704/275; 704/251; 455/563
[58] Field of Search .................................... 704/246, 251, 704/240, 236, 231, 255, 256; 455/563

[56] References Cited

U.S. PATENT DOCUMENTS

| | | | |
|---|---|---|---|
| 4,783,804 | 11/1988 | Juang et al. | 704/245 |
| 4,819,271 | 4/1989 | Bahl et al. | 704/256 |
| 5,023,912 | 6/1991 | Segawa | 381/43 |
| 5,027,406 | 6/1991 | Roberts et al. | 381/43 |
| 5,125,022 | 6/1992 | Hunt et al. | 379/88 |
| 5,127,043 | 6/1992 | Hunt et al. | 379/88 |
| 5,216,720 | 6/1993 | Naik et al. | 704/272 |
| 5,255,310 | 10/1993 | Kim et al. | 379/88 |
| 5,274,560 | 12/1993 | LaRue | 364/444 |
| 5,283,833 | 2/1994 | Church et al. | 381/41 |
| 5,297,194 | 3/1994 | Hunt et al. | 379/88 |
| 5,303,299 | 4/1994 | Hunt et al. | 379/88 |
| 5,365,574 | 11/1994 | Hunt et al. | 379/88 |
| 5,384,833 | 1/1995 | Cameron | 704/275 |
| 5,452,397 | 9/1995 | Ittycheriah et al. | 395/2.49 |
| 5,454,062 | 9/1995 | LaRue | 395/2.63 |
| 5,455,889 | 10/1995 | Bahl et al. | 704/236 |
| 5,497,319 | 3/1996 | Chong et al. | 364/419.02 |
| 5,499,288 | 3/1996 | Hunt et al. | 379/88 |
| 5,502,774 | 3/1996 | Bellegarda et al. | 382/159 |
| 5,504,805 | 4/1996 | Lee | 379/67 |
| 5,509,104 | 4/1996 | Lee et al. | 395/2.65 |
| 5,517,558 | 5/1996 | Schalk | 379/88 |
| 5,519,786 | 5/1996 | Courtney et al. | 382/159 |
| 5,526,465 | 6/1996 | Carey et al. | 704/250 |
| 5,535,120 | 7/1996 | Chong et al. | 364/419.03 |
| 5,566,272 | 10/1996 | Brems et al. | 704/231 |
| 5,623,578 | 4/1997 | Mikkilineni | 704/255 |
| 5,623,609 | 4/1997 | Kaye et al. | 704/1 |
| 5,640,490 | 6/1997 | Hansen et al. | 704/254 |
| 5,675,704 | 10/1997 | Juang et al. | 704/246 |
| 5,680,509 | 10/1997 | Gopalakrishnan et al. | 704/270 |
| 5,687,287 | 11/1997 | Gandhi et al. | 704/247 |

Primary Examiner—Richemond Dorvil
Assistant Examiner—M. David Sofocleous

[57] ABSTRACT

A method and apparatus for recognizing an identifier entered by a user. A caller enters a predetermined identifier through a telephone handset. A signal representing the entered identifier is transmitted to a remote recognizer, which responds to the signal by producing a recognized output intended to match the entered identifier. The present invention compares this recognized identifier with a list of valid reference identifiers to determine which one of these reference identifiers most likely matches the entered identifier. In performing this determination, the present invention employs a confusion matrix, which is an arrangement of probabilities that indicate the likelihood that a given character in a particular character position of the reference identifier would be recognized by the recognizer as a character in the corresponding character position of the recognized identifier. This determination yields an identifier recognition probability for every reference identifier, and the present invention selects the reference identifier with the highest identifier recognition probability as most likely corresponding to the spoken identifier. The invention is also provided with the capability of improving the recognition accuracy of the confusion matrix by eliminating from consideration the most often confused characters.

31 Claims, 10 Drawing Sheets

|  | | A | B | C | D | E | F | G | H | I | J | 0 | 1 | 2 | 3 | 4 | 5 | 6 | 7 | 8 | 9 |
|---|---|---|---|---|---|---|---|---|---|---|---|---|---|---|---|---|---|---|---|---|---|
| | A | .50 | | | | | | | | | | | | | | | | | | | |
| | B | | .70 | .05 | .20 | .20 | | | | | | | | | | | | | | | |
| | C | | | .90 | | | | | | | | | | | | | | | | | |
| | D | | .20 | .05 | | | | | | | | | | | | | | | | | |
| | E | | .05 | | | | | | | | | | | | | | | | | | |
| | F | | | | | | | | | | | | | | | | | | | | |
| | G | | | | | | | | | | | | | | | | | | | | |
| SPOKEN | H | | | | | | | | | | | | | | | | | | | | |
| | I | | | | | | | | | | | | | | | | | | | | |
| | J | .30 | | | | | | | | | | | | | | | | | | | |
| | 0 | | | | | | | | .90 | | | | | | | | | | | | |
| | 1 | | | | | | | | | .90 | | | | | | | | | | | |
| | 2 | | | | | | | | | | .90 | | | | | | | | | | |
| | 3 | | .05 | | .20 | .20 | | | | | | .90 | | | | | | | | | |
| | 4 | | | | | | | | | | | | .90 | | | | | | | | |
| | 5 | | | | | | | | | | | | | .90 | | | | | | | |
| | 6 | | | | | | | | | | | | | | .90 | | | | | | |
| | 7 | | | | | | | | | | | | | | | .90 | | | | | |
| | 8 | .20 | | | | | | | | | | | | | | | .90 | | | | |
| | 9 | | | | | | | | | | | | | | | | | .90 | | | |

FIG. 8(a)

```
                      RECOGNIZED
           |  A    B    C    D  |  1   2    3   4
        ---+--------------------+------------------
         A | .80  .15   0   .05 |  0   0    0   0
         B |  0   .70  .08  .20 |  0   0   .02  0
         C |  0    0   .90  .10 |  0   0    0   0
SPOKEN   D |  0   .15   0   .60 |  0   0   .25  0
           |                    |
         1 |  0    0    0    0  |  1   0    0   0
         2 |  0    0    0    0  |  0   1    0   0
         3 |  0    0   .02  .02 |  0   0   .78  0
         4 |  0    0    0    0  |  0   0    0   1
```

FIG. 8(b)

```
                  RECOGNIZED
           |  A    C  |  1   2    3   4
        ---+----------+------------------
         A |  1    0  |  0   0    0   0
         C |  0    1  |  0   0    0   0
           |          |
SPOKEN   1 |  0    0  |  1   0    0   0
         2 |  0    0  |  0   1    0   0
         3 |  0   .02 |  0   0   .98  0
         4 |  0    0  |  0   0    0   1
```

FIG. 10(α)

RECOGNIZED

|  | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| A | .33 | .33 | .33 |   |   |   |   |   |   |   |   |   |   |   |   |   |   |   |   |   |   |   |   |   |   |   |
| B | .33 | .33 | .33 |   |   |   |   |   |   |   |   |   |   |   |   |   |   |   |   |   |   |   |   |   |   |   |
| C | .33 | .33 | .33 |   |   |   |   |   |   |   |   |   |   |   |   |   |   |   |   |   |   |   |   |   |   |   |
| D |   |   |   | .33 | .33 | .33 |   |   |   |   |   |   |   |   |   |   |   |   |   |   |   |   |   |   |   |   |
| E |   |   |   | .33 | .33 | .33 |   |   |   |   |   |   |   |   |   |   |   |   |   |   |   |   |   |   |   |   |
| F |   |   |   | .33 | .33 | .33 |   |   |   |   |   |   |   |   |   |   |   |   |   |   |   |   |   |   |   |   |
| G |   |   |   |   |   |   | .33 | .33 | .33 |   |   |   |   |   |   |   |   |   |   |   |   |   |   |   |   |   |
| H |   |   |   |   |   |   | .33 | .33 | .33 |   |   |   |   |   |   |   |   |   |   |   |   |   |   |   |   |   |
| I |   |   |   |   |   |   | .33 | .33 | .33 |   |   |   |   |   |   |   |   |   |   |   |   |   |   |   |   |   |
| J |   |   |   |   |   |   |   |   |   | .33 | .33 | .33 |   |   |   |   |   |   |   |   |   |   |   |   |   |   |
| K |   |   |   |   |   |   |   |   |   | .33 | .33 | .33 |   |   |   |   |   |   |   |   |   |   |   |   |   |   |
| L |   |   |   |   |   |   |   |   |   | .33 | .33 | .33 |   |   |   |   |   |   |   |   |   |   |   |   |   |   |
| M |   |   |   |   |   |   |   |   |   |   |   |   | .33 | .33 | .33 |   |   |   |   |   |   |   |   |   |   |   |
| N |   |   |   |   |   |   |   |   |   |   |   |   | .33 | .33 | .33 |   |   |   |   |   |   |   |   |   |   |   |
| O |   |   |   |   |   |   |   |   |   |   |   |   | .33 | .33 | .33 |   |   |   |   |   |   |   |   |   |   |   |
| P |   |   |   |   |   |   |   |   |   |   |   |   |   |   |   | .25 | .25 | .25 | .25 |   |   |   |   |   |   |   |
| Q |   |   |   |   |   |   |   |   |   |   |   |   |   |   |   | .25 | .25 | .25 | .25 |   |   |   |   |   |   |   |
| R |   |   |   |   |   |   |   |   |   |   |   |   |   |   |   | .25 | .25 | .25 | .25 |   |   |   |   |   |   |   |
| S |   |   |   |   |   |   |   |   |   |   |   |   |   |   |   | .25 | .25 | .25 | .25 |   |   |   |   |   |   |   |
| T |   |   |   |   |   |   |   |   |   |   |   |   |   |   |   |   |   |   |   | .33 | .33 | .33 |   |   |   |   |
| U |   |   |   |   |   |   |   |   |   |   |   |   |   |   |   |   |   |   |   | .33 | .33 | .33 |   |   |   |   |
| V |   |   |   |   |   |   |   |   |   |   |   |   |   |   |   |   |   |   |   | .33 | .33 | .33 |   |   |   |   |
| W |   |   |   |   |   |   |   |   |   |   |   |   |   |   |   |   |   |   |   |   |   |   | .25 | .25 | .25 | .25 |
| X |   |   |   |   |   |   |   |   |   |   |   |   |   |   |   |   |   |   |   |   |   |   | .25 | .25 | .25 | .25 |
| Y |   |   |   |   |   |   |   |   |   |   |   |   |   |   |   |   |   |   |   |   |   |   | .25 | .25 | .25 | .25 |
| Z |   |   |   |   |   |   |   |   |   |   |   |   |   |   |   |   |   |   |   |   |   |   | .25 | .25 | .25 | .25 |

ENTERED (row label)

SYSTEM AND METHOD OF RECOGNIZING LETTERS AND NUMBERS BY EITHER SPEECH OR TOUCH TONE RECOGNITION UTILIZING CONSTRAINED CONFUSION MATRICES

CROSS-REFERENCE TO RELATED APPLICATIONS

The present application is related to U.S. patent application Ser. No. 08/763,382, filed Dec. 13, 1996, entitled "Statistical Database Correction Of Alphanumeric Account Numbers For Speech Recognition And Touch-Tone Recognition," and assigned to a common assignee.

BACKGROUND OF THE INVENTION

The present invention relates to a method and apparatus for recognizing an identifier that is entered into a system by a user on the basis of a probability determination that selects, from among a plurality of predetermined reference identifiers, a reference identifier that most likely matches the entered identifier. In particular, the method and apparatus of the present invention enhances the accuracy of such a probabilistic determination by limiting the allowable characters in the identifier to those characters that are not easily confused with one another.

Most institutions, such as banks and department stores, allow customers to access over the telephone a wide variety of services and account information. Before the advent of touch-tone telephones, a customer would obtain these services and information through interacting with a live operator. As touch-tone telephones became more prevalent in homes, these institutions began switching to automated customer-access systems. After dialing a telephone number, a customer using such systems would be asked to enter an account number or identifier. As used herein, the terms "account number" and "identifier" are used interchangeably, and they refer to a string of characters that may comprise a plurality of letters, numbers, or both. Furthermore, as used herein, an identifier may be used not only to identify a user, but also may be used as an identifier for identifying a particular product or service offered by an institution. In the first generation of automated customer-access systems, a user would enter such an identifier by sequentially pressing a series of keys provided on the telephone keypad. Each pressed key would correspond to a different character in the identifier. The pressing of these keys would produce a series of tones that would be provided over a telephone network to the institution. At the institution, the series of tones would be decoded to produce the entered identifier, and if the identifier entered by the user was determined to correspond to a valid identifier, then the user would be allowed to enter commands, again through the telephone keypad, that would provide access to whatever services would be offered by the institution.

The next generation of automated customer-access systems eliminates the use of telephone keypads to verify the identity of a valid user. Instead of entering an identifier through a telephone keypad, a user would be prompted to speak the identifier into the telephone handset. For example, the user may speak into the telephone the identifier "JB123E". The user's voice signal would be transmitted over the phone lines to the financial institution, which would employ a speech recognition system to produce a recognized identifier that is intended to correspond exactly to the identifier spoken by the user.

Nevertheless, such exact correspondence is quite difficult to attain, mostly due to the deterioration of voice signals that routinely occurs over conventional telephone lines. In particular, as a voice signal is transmitted to a remote location, conventional telephone lines introduce into such signals noise and restrictive band limitations. Such a deterioration present in a voice signal may cause a remote speech recognizer to produce a recognized output that does not correspond to the spoken identifier. Because of the limitations introduced into the voice signal by the telephone lines, the speech recognizer may confuse similar sounding letters and numbers. Thus, a speech recognizer may confuse the letter "A" with the number "8", the letter "K", or the letter "J". Similarly, the speech recognizer may confuse the letter "C" with the letter "D" or the number "3". For example, given that a user speaks the identifier "JB123E" into a telephone, the speech recognizer may produce "AE123D" as an output. Accordingly, a need exists to enhance the accuracy of such speech recognition systems and overcome the limitations introduced into voice signals by typical communication lines, such as, for example, conventional telephone lines.

Similarly, touch-tone recognition systems also mistakenly recognize the wrong identifier. Accordingly, a need also exists to enhance the accuracy of such touch-tone recognition systems.

SUMMARY OF THE INVENTION

In order to overcome these deficiencies, the present invention is directed to a method and apparatus that enhances the reliability of a system intended to recognize multi-character identifiers provided by a remote user.

In a representative embodiment of the present invention, a recognized voice output, representing a predetermined identifier, is provided to a processor. This recognized identifier is based on a identifier spoken into a telephone by a user. The processor is coupled to a database that contains a plurality of valid identifiers. These identifiers residing in the database are referred to as reference identifiers. The processor is also coupled to a memory that stores a plurality of probabilities arranged as at least one confusion matrix. The processor obtains from the database a reference identifier for comparison to the recognized identifier. Starting at the first character position for both the recognized identifier and the reference identifier, the processor uses the confusion matrix to obtain the probability that the character found in the first character position of the reference identifier would be recognized as the character found in the first character position of the recognized identifier. Probabilities are obtained in such a manner for every character position in the reference and recognized identifiers. Thus, after obtaining the probability for the characters of the reference and recognized identifiers found in their respective first character positions, the processor obtains the probability that the character found in the second character position of the reference identifier would be recognized as the character found in the second character position of the recognized identifier, etc. After all the probabilities have been obtained with respect to the recognized identifier and the reference identifier, an identifier recognition probability is determined based on the obtained probabilities. For example, the identifier recognition probability may be based on the multiplication of such obtained probabilities. The processor repeats this procedure for every reference identifier stored in the database. After this procedure is performed for every reference identifier, the processor selects from the plurality of reference identifiers the reference identifier most likely matching the spoken identifier. This selection may be accomplished, for example, by selecting the reference identifier corresponding to the highest identifier recognition probability; this selected identifier is presented to the user as the one most likely matching the spoken identifier.

In another representative embodiment, the user is provided with an opportunity to indicate whether the selected reference identifier corresponds to the spoken identifier. If the user indicates that a match exists, then the user is allowed to access the services provided by the institution that implements the present invention. If, however, the user indicates that the selected reference identifier does not match the spoken identifier, the present invention provides a new plurality of reference identifiers from the database. This new plurality of reference identifiers does not include the previously selected reference identifier. Recognition probabilities are calculated and assigned to every reference identifier in this new plurality, in accordance with the procedure described above, and the reference identifier in this new plurality corresponding to the highest probability is selected as being the most likely to match the spoken identifier. If such a match is indicated by the user, the user is given access to the account corresponding to the identifier. If the user indicates again that a match does not exist, then the processor repeats the same procedure with yet another new plurality of reference identifiers. This latest plurality of reference identifiers reinstates the previously excluded reference identifier, but eliminates from consideration the most recently selected reference identifier.

According to another representative embodiment of the present invention, no reference identifier may be selected as a possible match for the spoken identifier unless the identifier recognition probability corresponding to the reference identifier exceeds a predetermined threshold. In this embodiment, after each reference identifier under consideration is assigned a corresponding identifier recognition probability, the processor determines which, if any, reference identifiers are associated with identifier recognition probabilities that exceed a predetermined threshold. If no such reference identifiers are currently available, the processor discards the results of the procedure and prompts the user to speak the identifier again. If any identifier exceeds the predetermined threshold, the processor selects the highest from among these probabilities. This selected reference identifier is presented to the user for an indication of whether it indeed matches the spoken identifier. If the user indicates that no such match exists, the present invention can either re-prompt the user to speak the identifier again, or present to the user the reference identifier corresponding to the next highest probability that exceeded the predetermined threshold. So long as the list of reference identifiers with probabilities in excess of the threshold is not exhausted, the processor continuously presents to the user the reference identifier with the next highest probability until a positive match is indicated.

In yet another representative embodiment of the present invention, the recognition accuracy of a confusion matrix is enhanced by constraining the set of allowable characters in the confusion matrix in order to eliminate the most often confused characters. This constraining routine is carried out by the processor in accordance with a set of instructions provided in a constrained grammar memory. Once the most often confused characters are eliminated from consideration, the recognition accuracy of the remaining letters is heightened.

According to yet another representative embodiment, the present invention is implemented in a touch tone recognition system. In this embodiment, a user enters an identifier through a conventional keypad of a touch-tone telephone. The system produces a recognized identifier and establishes an identifier recognition probability for every reference identifier in memory, in the same manner as discussed above for the speech recognition system. The touch-tone recognition system would then selects the identifier most likely matching the input identifier from these reference identifiers. For example, the identifier most likely matching the input identifier may correspond to the reference identifier with the highest identifier recognition probability.

BRIEF DESCRIPTION OF THE DRAWINGS

Other features and advantages of the present invention will become apparent from the following detailed description, together with the drawings, in which:

FIG. 2 shows a confusion matrix for arranging a plurality of probabilities indicative of the likelihood that a particular character in a reference identifier was spoken by a user;

FIG. 8($a$) shows a second confusion matrix;

FIG. 8($b$) shows the confusion matrix of FIG. 8($a$) after the confusion matrix of FIG. 8($a$) has been constrained in accordance with the instructions provided by a constrained grammar memory;

DETAILED DESCRIPTION OF THE INVENTION

Figure 1:
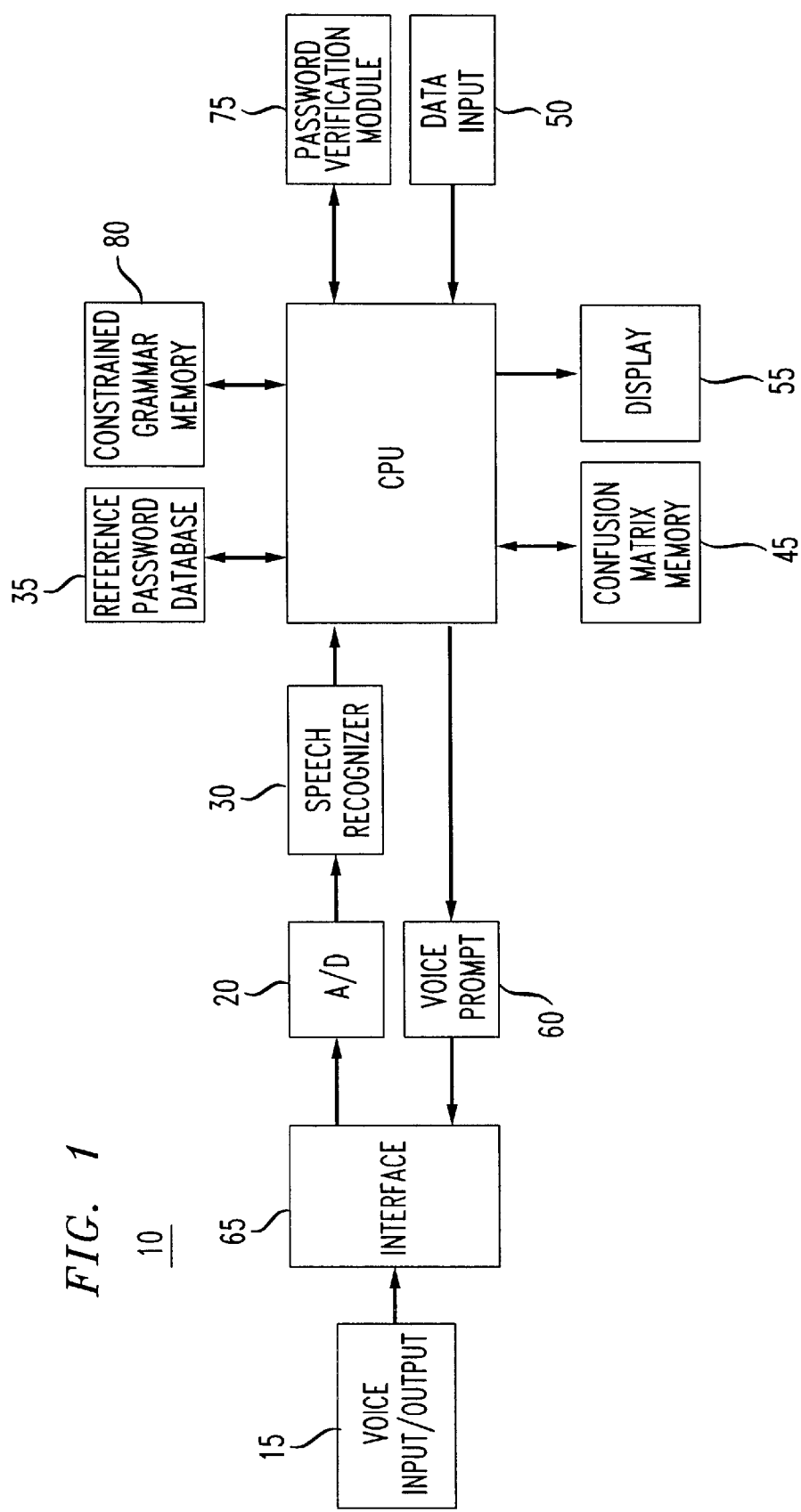
FIG. 1 shows a block diagram of a speech recognition system in accordance with the present invention.

FIG. 1 illustrates a system that implements the speech recognition routine of the present invention. The system of FIG. 1 is merely an example of one kind of system that is capable of supporting the present speech recognition routine, and it should be appreciated that the present speech recognition routine is compatible with numerous other applications. For example, the present invention is applicable to touch-tone recognition systems as well.

The system 10 of FIG. 1 includes a voice input/output device 15, which may comprise a conventional telephone or microphone. A user wishing to access a particular service provided by the system would be prompted to speak into voice input/output device 15 a predetermined identifier. For purposes of this discussion, the user shall be assumed to speak a valid identifier into device 10. This voice signal can be carried over a telephone line to a public telephone network interface 65, which interfaces the voice signal generated by voice input/output device 10 to the remaining components of the speech recognition system. Of course, any wired or wireless connection could convey the voice signal to the speech recognition system. The system of FIG. 1 further includes an A/D converter 20, which converts the analog voice signal provided by interface 65 into a digital signal. A/D converter 20 supplies the digitized voice signal to speech recognizer 30, which may comprise, for example, a HARK 3.0 recognizer, which is manufactured by BBN Co. After employing a recognition routine, for example, the Hidden Markov Model, speech recognizer 30 provides as an output a recognized identifier, which may or may not correspond to the identifier that the user spoke into the telephone. The recognized identifier is provided to an input of CPU 40. CPU 40 is configured to determine whether the recognized identifier corresponds to any one of a plurality of valid identifiers stored in database 35, which may comprise a hard disk or any other suitable storage medium capable of storing a large number of account numbers.

The identifier recognition routine that CPU 40 uses to verify the validity of a recognized identifier is stored in identifier verification module 75. Used in conjunction with the routine of module 75 is a confusion matrix, which is stored in memory 45, and a constrained grammar memory 80, both of which shall be described along with the routine of module 75 soon hereafter. CPU 40 controls a voice prompt device 60, which may comprise DIALOGIC telephone interface cards. CPU 40 causes voice prompt device 60 to issue voice inquiries to a user at voice input/output device 15. For example, the voice prompt device 60 may issue an inquiry such as "Please tell me your identifier". The system of FIG. 1 also includes a data input device 50, such as a keyboard, a CD-ROM drive, or a floppy drive, and the system of FIG. 1 is also provided with a display 55.

FIG. 2 illustrates a confusion matrix that includes a plurality of character recognition probabilities used by CPU 40 to validate the veracity of a recognized identifier provided by speech recognizer 30. For the example provided in FIG. 2, the identifier grammar shall be LLNNNE. That is, each one of the valid identifiers stored in database 35 is six characters long, in which the first two character positions may comprise only letters of the alphabet, the third through fifth character positions may comprise only numerals 0–9, and the last character position may comprise either a letter or a numeral. In order to avoid confusing the letter "O" with the numeral "0", the identifier grammar may be configured to exclude the letter "O" as a possible letter to be used in the first, second, or last character positions, and recognizer 30 would be configured to recognize the numeral "0" when it is spoken by a user either as "oh" or "zero". Of course, the characters that constitute the identifier grammar can be configured to be of whatever length and may comprise any combination of letters, numerals, or both.

Since illustrating a confusion matrix for the entire alphabet is not necessary to explain the operation of the identifier recognition routine, the confusion matrix of FIG. 2 is limited to a portion of the alphabet. Furthermore, the matrix is not provided with every entry because the following discussion shall refer to a limited number of identifiers and the entries provided in the matrix correspond to those letters that are included in this limited group of identifiers. Thus, all the blanks in FIG. 2 should be considered to be zero. Of course, when the system of the present invention is implemented, the confusion matrix would be provided with a complete set of entries and the database would be provided with a large amount of identifiers, for example, 100,000.

The confusion matrix of FIG. 2 is read as follows: the vertical columns correspond to letters and numbers that were recognized by recognizer 30, and the horizontal rows correspond to letters and numbers spoken into the telephone. Of course, the confusion matrix of FIG. 2 may be configured in reverse, in which the horizontal rows correspond to letters and numbers recognized by recognizer 30, and in which the vertical columns correspond to letters and numbers spoken into the telephone. The decimals that are provided in the confusion matrix represent different probabilities. For example, based on the confusion matrix of FIG. 2, given that "A" is recognized by recognizer 30, the probability that "A" was spoken by a user into a telephone is 50%. For the recognized letter "A", there is also a probability of 30% that "J" was spoken, and there is a probability of 20% that "8" was spoken when "A" was recognized.

The particular character recognition probabilities that are provided in FIG. 2 are determined in advance through experimentation, and they are tailored to suit the particular recognizer 30 that is used in the system of FIG. 1. Thus, when a particular recognizer is to be used in the system of FIG. 1, a test group of persons repetitively provides pronunciations of each of the letters and numerals, and the recognized output of recognizer 30 for each pronunciation is recorded. In order that the results of these tests incorporate the influence of the noise and bandwidth limitations that affect speech recognizers operating under real conditions, the vocal pronunciations of this test group of persons may be provided to the speech recognizer over a telephone line. From these various "trial runs" of the recognizer 30, the probabilities that characterize the recognition accuracy of the recognizer are established, and these probabilities can be entered as a confusion matrix into memory 45 through data input device 50. Since different recognizers exhibit different recognition accuracies, if recognizer 30 is to be replaced with a different recognizer, a confusion matrix corresponding to the replacement recognizer must be entered into memory 45. Or alternatively, memory 45 may store in advance a plurality of predetermined confusion matrices corresponding to different recognizers, so that when a replacement recognizer is implemented, the corresponding confusion matrix may be selected by entering a command through input device 50. It should be noted that the probabilities of a confusion matrix need not be arranged in matrix form, but may be arranged as an array, or as any other data structure capable of associating a recognized and spoken character in terms of a probability.

Figure 3:
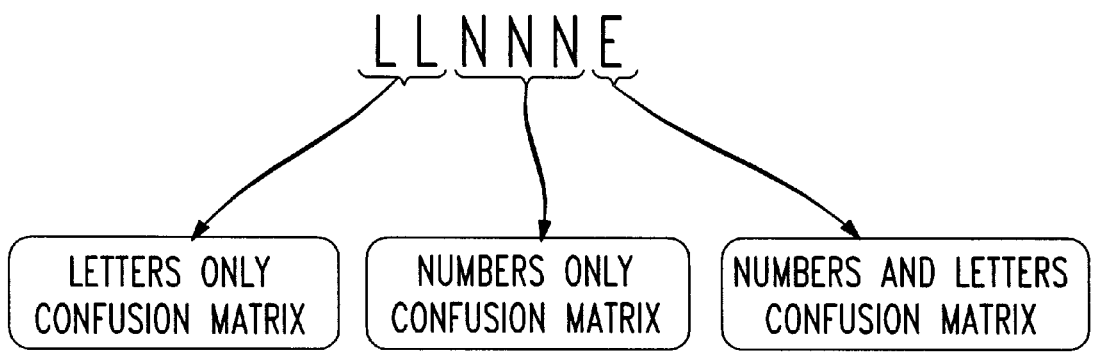
FIG. 3 shows a first predetermined identifier grammar.

Another alternative embodiment is shown in FIG. 3, in which a separate confusion matrix is provided for each portion of the code. For example, if the predetermined identifier grammar described above is used, then CPU 40 would access from memory 45 (1) a "letters only" confusion matrix when analyzing the first two character positions (2) a "numbers only" confusion matrix for the next three character positions, and a "numbers and letters" confusion matrix, such as the one in FIG. 2, for the last character position. By using such separate confusion matrices, the recognition accuracy of the overall system is improved. For example, when analyzing a "letters only" character position, the "letters only" confusion matrix will not allow for the possibility that a recognized "A" was mistaken by recognizer 30 for a spoken "8". Thus, the probability that a spoken "A" is actually recognized as an "A" increases because one possibly confusing character, the number "8", has been eliminated from consideration.

Figure 4:
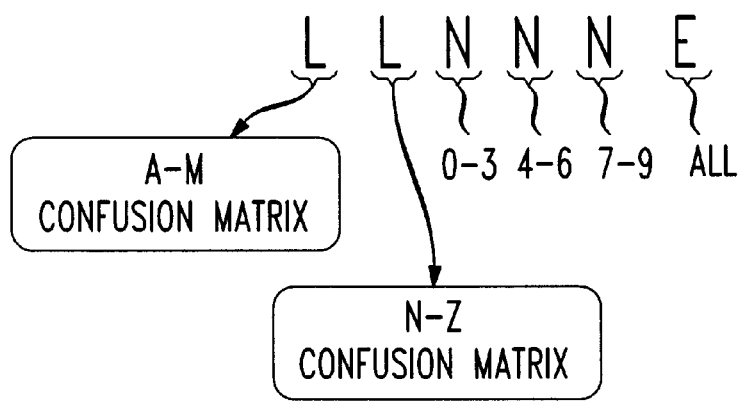
FIG. 4 shows a second predetermined identifier grammar.

Of course, FIG. 3 does not illustrate the only possible correspondence between confusion matrices and character positions in a character string. As FIG. 4 illustrates, each character position in a predetermined grammar may be assigned its own confusion matrix. Furthermore, each particular character position may be constrained as to the number of possible characters that can occupy that position. For example, in FIG. 4, the only characters that can occupy the first character position are the letters "A" through "M"; the only characters that can occupy the second character position are the letters "N" through "Z"; the only characters that can occupy the third character position are the numbers "0" through "3"; the only characters that can occupy the fourth character position are the numbers "4" through "6"; the only characters that can occupy the fifth character position are the numbers "7" through "9"; and the last character position would not be limited as to which letters or numbers can permissibly occupy that last position.

When the predetermined grammar of the identifier is limited as in FIG. 4, each character position is assigned a confusion matrix that is matched to the particular constraints placed on the corresponding character position. Thus, the first character position corresponds to a confusion matrix that accounts only for the possibility that letters A through M could have been spoken; the second character position corresponds to a confusion matrix that accounts only for the possibility that letters N through Z could have been spoken; the third character position corresponds to a confusion matrix that accounts only for the possibility that numbers "0" through "3" were spoken; the fourth character position corresponds to a confusion matrix that accounts only for the possibility that numbers "4" through "6" were spoken; the fifth character position corresponds to a confusion matrix that accounts only for the possibility that the numbers "7" through "9" were spoken; and the sixth character position corresponds to a confusion matrix that takes into account either letters or numbers.

The various confusion matrices of FIGS. 3 and 4 may be stored in advance in memory 45, and CPU 40 may automatically switch among them, depending on which predetermined grammar is used and which character position is being currently analyzed.

The present invention also provides a mode of operation in which the recognition accuracy afforded by the various confusion matrices stored in memory 45 is further enhanced. Referring again to FIG. 1, after the confusion matrix for a particular speech recognizer is established and stored in memory 45, CPU 40 uses the data stored in constrained grammar memory 80 to eliminate certain characters from consideration. As explained before, recognizers sometimes confuse letters and numbers that sound alike. The particular characters that are to be eliminated from the confusion matrix memory in accordance with the instructions from memory 80 correspond to those confusingly similar characters. For example, for a particular recognizer, it may be determined that a particular set of characters {B, C, D, E, G, T, V, Z, and 3} are often confused with one another. By constraining the identifier grammar and the corresponding confusion matrix so that only some of these confusingly similar characters may be used to form valid identifiers, the present invention heightens the recognition accuracy of system 10. Referring to the set of confusingly similar characters, it may be determined through experimentation with a particular recognizer that the letters T and Z are often confused with each other and with the number 3. Based on this empirically determined observation, constrained grammar memory 80 may be configured to instruct CPU 40 to discard the letters T and Z from the confusion matrix corresponding to the particular speech recognizer. By eliminating these letters from the confusion matrix, CPU 40 ensures that the recognition accuracy for the remaining letters is improved.

FIGS. 8(a) and 8(b) illustrate the operation of the system according to the instructions provided in constrained grammar memory 80. In this example, for the sake of simplicity, the only allowable characters are {A, B, C, D, 1, 2, 3, and 4}. As illustrated in FIG. 8(a), a confusion matrix for these characters may establish that the probability that A is recognized as B is 15% and that the probability that A is recognized as D is 5%. That would leave a probability of 80% that A would be accurately recognized as A. Of course, this confusion matrix is particular to a specific speech recognizer; a different speech recognizer would most likely yield a confusion matrix having probabilities that are different from the ones illustrated in FIG. 8(a). Based on the confusion matrix of FIG. 8(a), it can be realized that the recognition accuracy for the letter A may be raised to 100% for this speech recognizer if the allowable identifiers stored in database 35 are prohibited from including in any character position the letters B and D. Accordingly, constrained grammar memory 80 would be provided with instructions requiring CPU 40 to alter the confusion matrix stored in memory 45 to eliminate the letters B and D. The resulting confusion matrix, shown in FIG. 8(b), would yield a recognition accuracy of 100% not only for the letter A, but also for letter C and numbers 1, 2, and 4, because these remaining characters could no longer be confused with the letters B and D. For a different recognizer and a different grammar, it may be determined that, for example, the letter A is most often confused with the letters J and K. For such a recognizer, constrained grammar memory 80 would be configured to cause CPU 40 to eliminate from this confusion matrix the letters J and K.

The contents of constrained grammar memory 80 may be provided in advance before the set up of the system 10. Thus, prior to the generation of valid identifiers for reference identifier database 35, CPU 40 may constrain the identifier grammar of the confusion matrix corresponding to the speech recognizer 30 in accordance with the constraints provided in constrained grammar memory 80. After these constraints have been imposed, a set of valid reference identifiers for database 35 may be generated in accordance with these constraints. Furthermore, constrained grammar memory 80 may be provided with a set of instructions for every type of speech recognizer that is compatible with the system 10. These multiple constraint instruction sets afford system 10 with the flexibility to employ a wide range of recognizers that have been constrained in accordance with a corresponding set of constraints. Thus, when a new speech recognizer is implemented in system 10, a simple command entered through data input device 50 can cause constrained grammar memory 80 to select the set of constraint instructions corresponding to the new recognizer. Accordingly, the confusion matrix corresponding to the new speech recognizer, also stored in advance in memory 45, may be constrained as explained above in accordance with the corresponding constraint instructions supplied from memory 80.

Once the set of allowable characters have been constrained in accordance with the procedure described above, the minimum character length of the identifiers to be used in system 10 may be computed. Assume that the number of allowable characters is M, and that Y identifiers are to be generated. Moreover, if it is assumed that the grammar of LLNNNE, or any other such grammar, is not used, but that each character position in these Y identifiers can include any one of the M allowable characters, then the character length N of the identifier is given by the following expression:

$$N \geq \log Y / \log M$$

For example, if the number Y of account numbers is determined to be 500,000, and the number M of allowable characters is sixteen, then the character length N of each identifier is given by the following equation:

$$N \geq \log 500,00/\log 16$$

$$N \geq 4.73$$

or $$N = 5$$

If, however, the identifiers to be used in system 10 are required to follow a predetermined grammar, such as the grammar LLNNNE described above, then a different procedure for determining the composition of the reference identifiers must be used. For example, if 800,000 identifiers are needed, each identifier being arranged according to the grammar LLNNNE, then the number of allowable letters, numbers, and total number of characters is to be calculated as follows:

$$n_L n_L n_N n_N n_N n_E \geq 800,000$$

Through experimentation, a particular set of characters conforming to a desired recognition accuracy is selected as described above. For example, the allowable letters may comprise {D, F, J, M, O, R, U, W, and S}; the allowable numbers may comprise {0, 1, 2, 3, 4, 5, 6, 7, and 8}; and the allowable alphanumeric set may comprise {D, F, J, M, O, R, W, 0, 1, 2, 3, 4, 5, 6, 7, 8, and 9}. In this arrangement of characters, "zero" and "oh" would be treated as the same. Thus, the total number of alphanumeric characters, $n_E$, would be 16, not 17. Further, based on this selection of characters, $n_N$ would equal 9, and $n_L$ would equal 9. In order to ensure that this selection of characters provides 800,00 possible identifiers, the above equation must be calculated:

$$(9)(9)(9)(9)(9)(16) = 944,784 \geq 800,000$$

If more account numbers were needed, but the same grammar of LLNNNE was to be adhered to, then the amount of allowable characters would need to be increased. For example, if at least 1.2 million identifiers were needed, increasing $n_N$ to 10 by including the number 9 as an allowable character would produce the following result:

$$(9)(9)(10)(10)(10)(16) = 1,296,000 \geq 1,200,000$$

Figure 5:
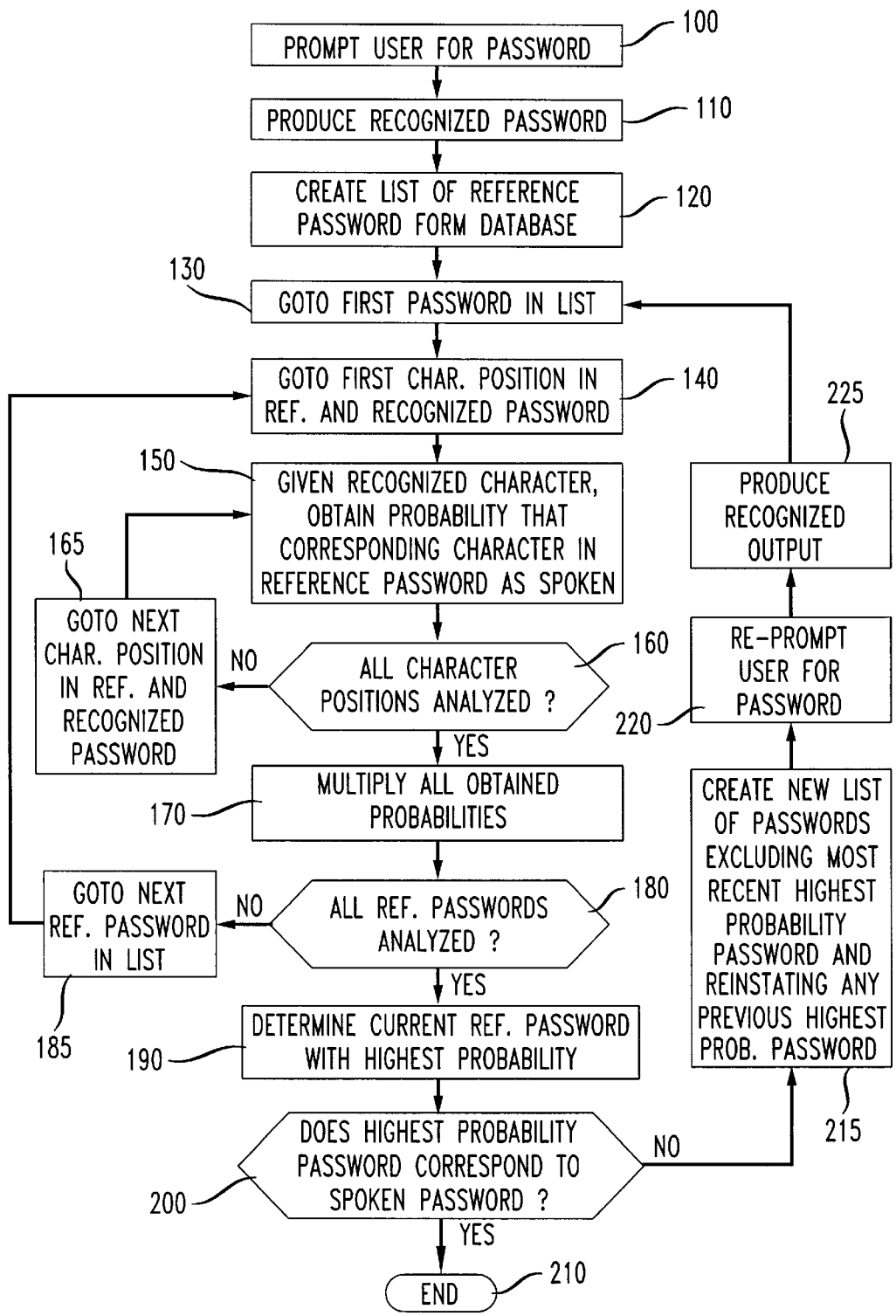
FIG. 5 shows a flow diagram corresponding to a first embodiment for determining which reference identifier was most likely spoken by a user.
Figure 6:
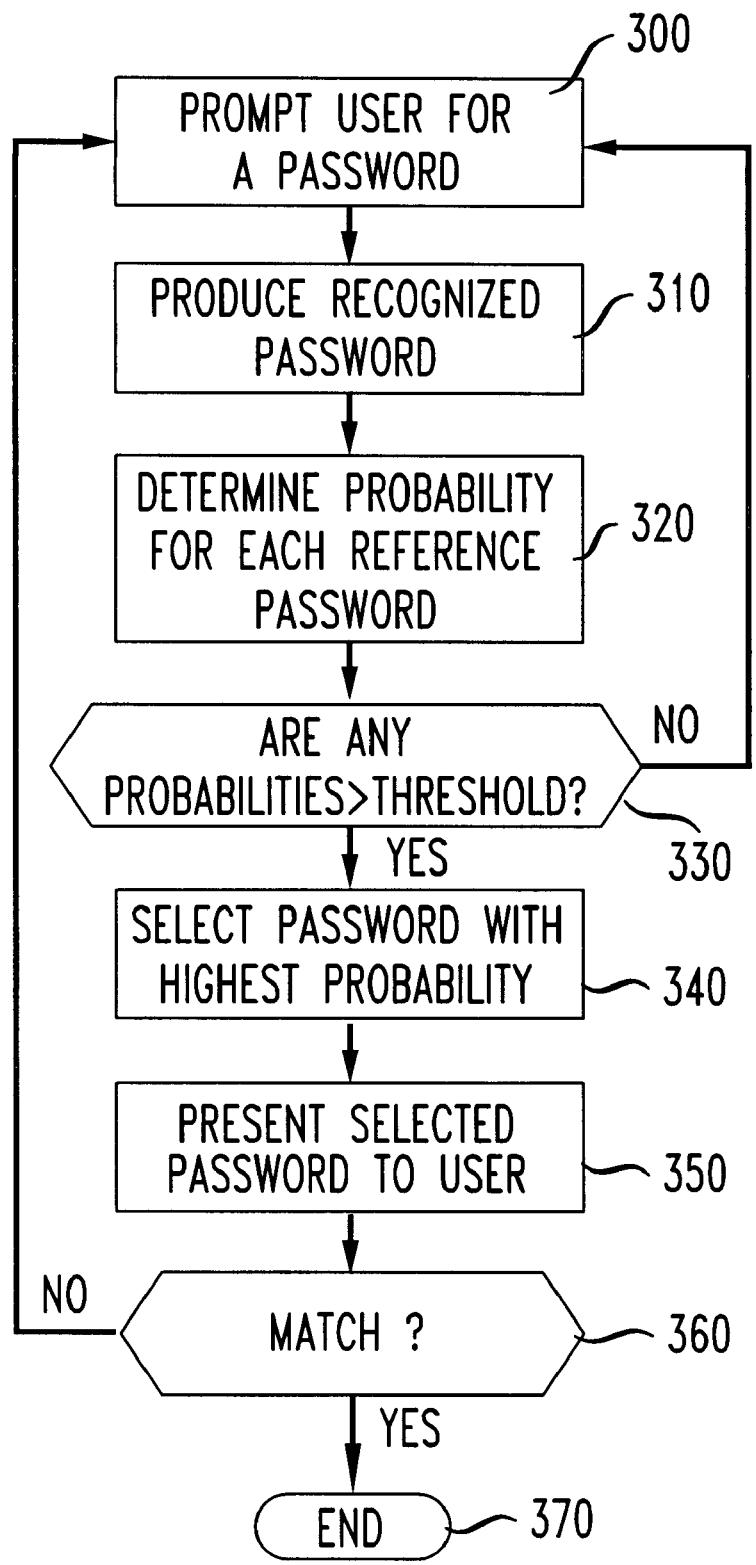
FIG. 6 shows a flow diagram corresponding to a second embodiment for determining which reference identifier was most likely spoken by a user.
Figure 7:
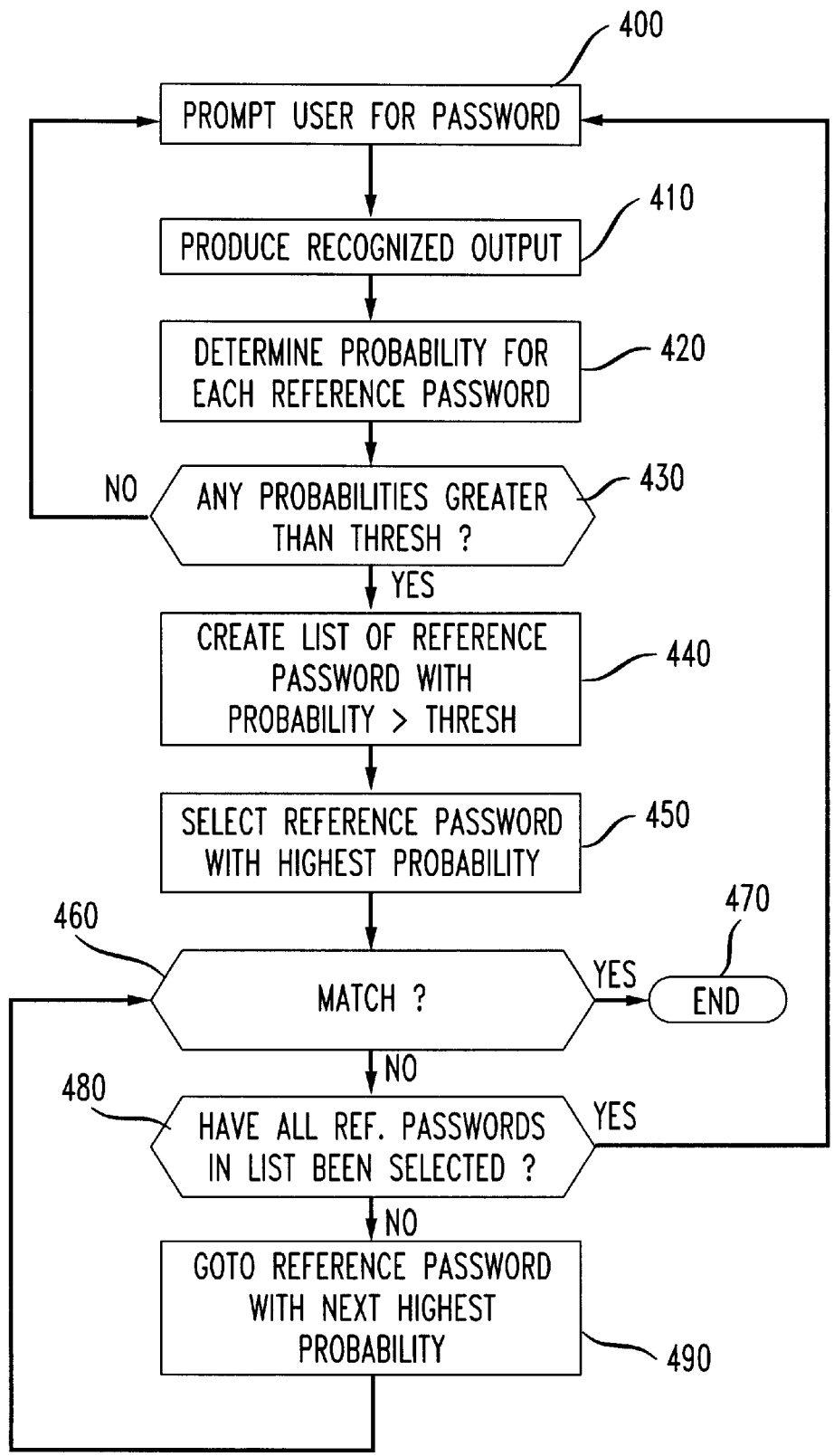
FIG. 7 shows a flow diagram corresponding to a third embodiment for determining which reference identifier was most likely spoken by a user.

The flow charts of FIGS. 5–7 illustrate the operation of CPU 40 in accordance with various identifier verification routines stored in module 75. Depending on the particular implementation, CPU 40 may select among these stored routines either automatically or based on a command entered through data input device 50. With respect to FIG. 5, voice prompt device 60, under the control of CPU 40, prompts the user to speak his identifier (step 100). For illustrative purposes, the spoken identifier shall be assumed to be AE123D and it is assumed to be valid. The voice signal corresponding to this identifier is supplied through interface 65 to A/D converter 20, which generates a digitized voice signal corresponding to the spoken identifier. This digitized voice signal is supplied to recognizer 30, which produces a digital code (recognized identifier) that may or may not include each character of the identifier that was spoken by the user (step 110). In this example, the recognized identifier shall be assumed to be JB123E. CPU 40 then creates a list of reference identifiers from the identifiers stored in database 35 (step 120). As shall be explained later, this list may or may not include every identifier stored in database 35.

After generating the list of reference identifiers, CPU 40 goes to the first reference identifier in the list (step 130), and in particular, to the first character in the recognized and reference identifiers (step 140). For the sake of simplicity, assume that the first identifier in the list is AE123D. CPU 40 then obtains from memory 45 a confusion matrix. As explained above, this confusion matrix may or may not be constrained in the manner explained with respect to FIGS. 8(*a*) and 8(*b*). For the purpose of discussing the routines of FIGS. 5–7, it shall be assumed that the confusion matrix of FIG. 2 is used. Given that J, the first character in the recognized identifier, was recognized, CPU 40 determines from the confusion matrix the probability that A was spoken (step 150). As explained before, the confusion matrix used may be one that encompasses letters or numbers or both, or one that encompasses a subset of letters or numbers.

After obtaining such a probability, CPU 40 determines whether all the character positions of the reference and recognized identifiers have been analyzed (step 160). If not, CPU 40 moves to the next character position for both the recognized and reference identifiers (step 165) and consults the confusion matrix again to determine the probability of recognizing the particular character of the recognized identifier when the corresponding character of the reference identifier was spoken. This procedure is carried out until a probability is determined for every character position. After the last character positions have been analyzed, CPU 40 multiplies all the obtained probabilities for each character position (step 170). The result of this multiplication represents, given that the recognized identifier was recognized, the probability that the reference identifier used in this iteration was actually spoken. This probability is referred to as an identifier recognition probability. In the example given above, given that JB123E is recognized, the probability that AE123E is spoken may be determined to be 30%, based on the confusion matrix. After determining this probability, CPU 40 then goes to the next reference identifier (step 185), and repeats steps 140–170 to obtain another probability. This process is repeated until an identifier recognition probability has been determined for every reference identifier in the list.

Once all these probabilities have been determined, CPU 40 determines the reference identifier that has been assigned the highest probability (step 190). CPU 40 then causes voice prompt device 60 to ask the user if the reference identifier with the highest probability matches the identifier originally spoken by the user (Step 200). If a match exists, then the speech recognition procedure ends and the user accesses the information or services to which he is entitled.

If a match does not exist, then CPU 40 creates a new list of reference identifiers that excludes the most recently determined identifier with the highest probability (step 215). In step 215, CPU 40 also reinstates any previously determined "highest probability" identifiers. For example, if the first iteration of the procedure in FIG. 5 produces a mismatch based on reference identifier JD875C, then JD875C is excluded from being compared to a recognized identifier during a second iteration of the procedure of FIG. 5. If the second iteration produces a mismatch based on reference identifier BC421J, then in the third iteration, BC421J is excluded from consideration and JD875C is reinstated into the list of reference identifiers. This reinstatement is done in case a user actually indicated in a previous iteration that a match did exist between the reinstated identifier and the spoken identifier, but the system erroneously understood this indication to mean that a mismatch existed. Thus, if a user indicated that a match existed based on identifier JD875C, but the system misunderstood the user to mean that a mismatch existed, identifier JD875C would be reconsidered again because of the reinstatement in step 215. Of course, this reconsideration would not occur until after another complete iteration is done without the identifier JD875C. That is, the user would indicate that the highest probability identifier in the next iteration is not the correct one, and the system would reinstate identifier JD875C in a subsequent iteration. Thus, the system would be provided with another opportunity to identify identifier JD875C as the one that the user spoke into the telephone.

Once a new list is created (step 215), CPU 40 re-prompts the user to pronounce the identifier again. After speech recognizer 30 produces a recognized identifier, the procedure above for determining the highest probability identifier is repeated. The re-prompting step and the step of producing a second recognized identifier is optional, since the originally spoken identifier and recognized identifier can be compared to the new list.

In another embodiment, the entire result of an iteration is discarded if all the calculated probabilities are below a certain threshold. As illustrated in FIG. 6, a user is prompted for an identifier (step 300). After producing a recognized identifier corresponding to the spoken identifier (step 310), CPU 40 determines a recognition probability for each reference identifier in the same manner as illustrated in FIG. 5 (step 320). After determining a probability for every reference identifier, CPU 40 determines if any of these probabilities exceeds a predetermined threshold (step 330). The threshold is determined experimentally and is set low enough so that any probability falling below or matching the threshold would not be reasonably regarded as corresponding to a correctly recognized identifier. If no probability exceeds the predetermined threshold, then the procedure returns to step 300. If at least one probability exceeds the threshold, then the identifier corresponding to the highest among these probabilities is presented to the user (steps 340, 350). If the user indicates that a match exists (step 360), then the procedure ends (step 370). If no match exists, then the procedure begins again at step 300.

Alternatively, as indicated in FIG. 7, CPU 40 can be configured to create a list of those reference identifiers, each of these reference identifiers corresponding to an identifier recognition probability that exceeds a predetermined threshold (step 440). The reference identifier in this list that corresponds to the highest identifier recognition probability is presented to the user (step 450). If the user indicates that a match does not exist (step 460), then instead of reprompting the user, CPU 40 presents the user with the identifier corresponding to the next highest probability in the list (step 490). Such a procedure could be repeated until the user indicated that a match existed (step 460) or until CPU 40 exhausted all the probabilities that exceeded the predetermined threshold (step 480).

Figure 9:
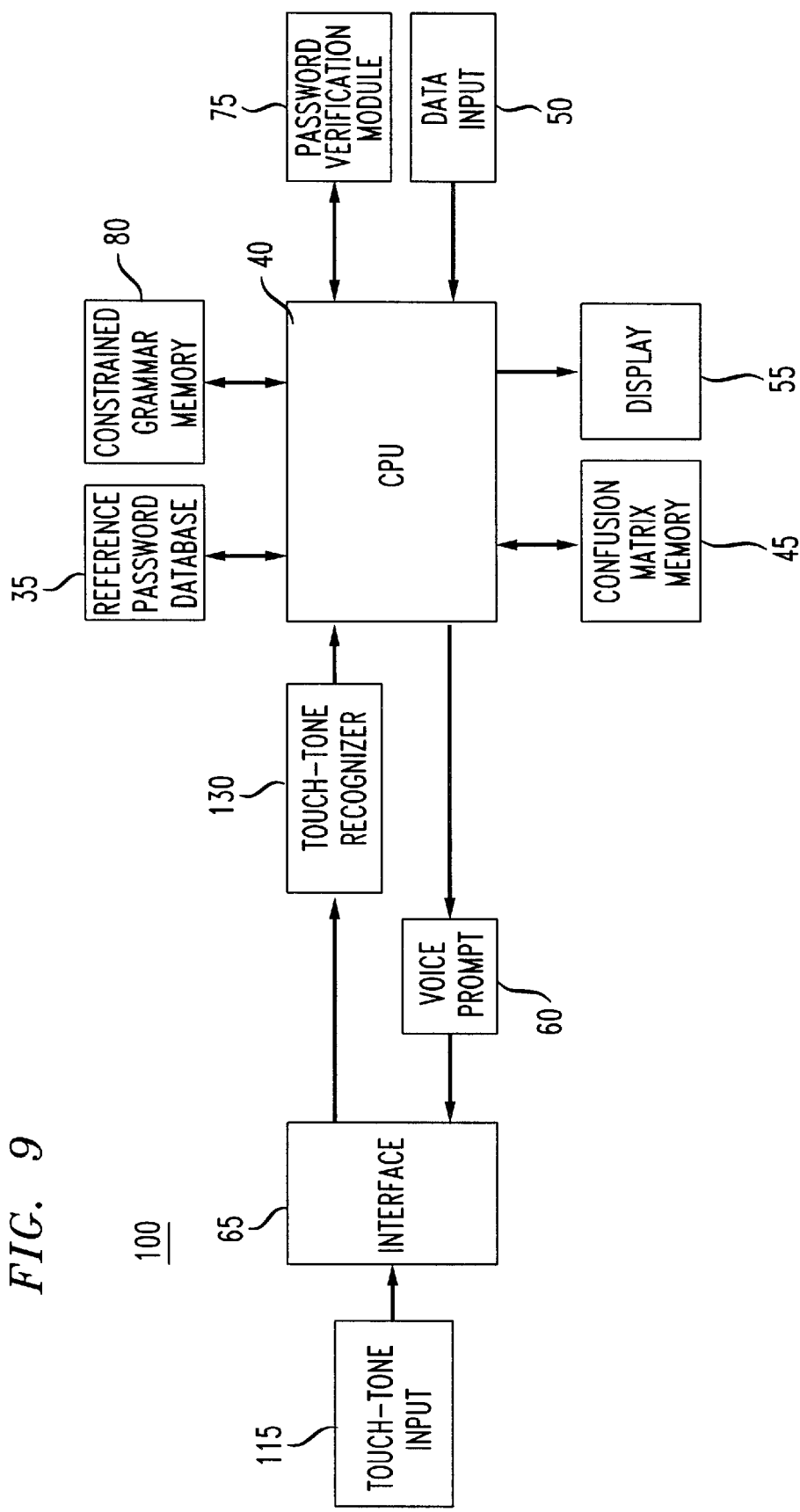
FIG. 9 shows a block diagram of a touch-tone recognition system in accordance with the present invention.

In yet another embodiment of the present invention, FIG. 9 illustrates a touch-tone recognition system 100 that also implements at least one confusion matrix in order to enhance the recognition accuracy of the system. The components in FIGS. 1 and 9 that are referred to by the same reference character can be considered to be the same component. A user enters through touch-tone input device 115 an identifier that may comprise an alphanumeric string of characters. Touch-tone input device 115 may comprise the keypad of a typical touch-tone telephone. In this embodiment it shall be assumed, for exemplary purposes only, the key numbered "2" on the keypad corresponds to letters "A", "B", and "C"; that the key numbered "3" corresponds to letters "D", "E", and "F"; that the key numbered "4" corresponds to letters "G", "H", and "I"; that the key numbered "5" corresponds to letters "J", "K", and "L"; that the key numbered "6" corresponds to letters "M", "N", and "O"; that the key numbered "7" corresponds to letters "P", "Q", "R", and "S"; that the key numbered "8" corresponds to letters "T", "U", and "V"; and that the key numbered "9" corresponds to letters "W", "X", "Y", and "Z". Of course, this particular correspondence between numerical keys and alphabetical letters is only one of many possible arrangements that may be established in touch-tone recognition systems.

Figure 10B:
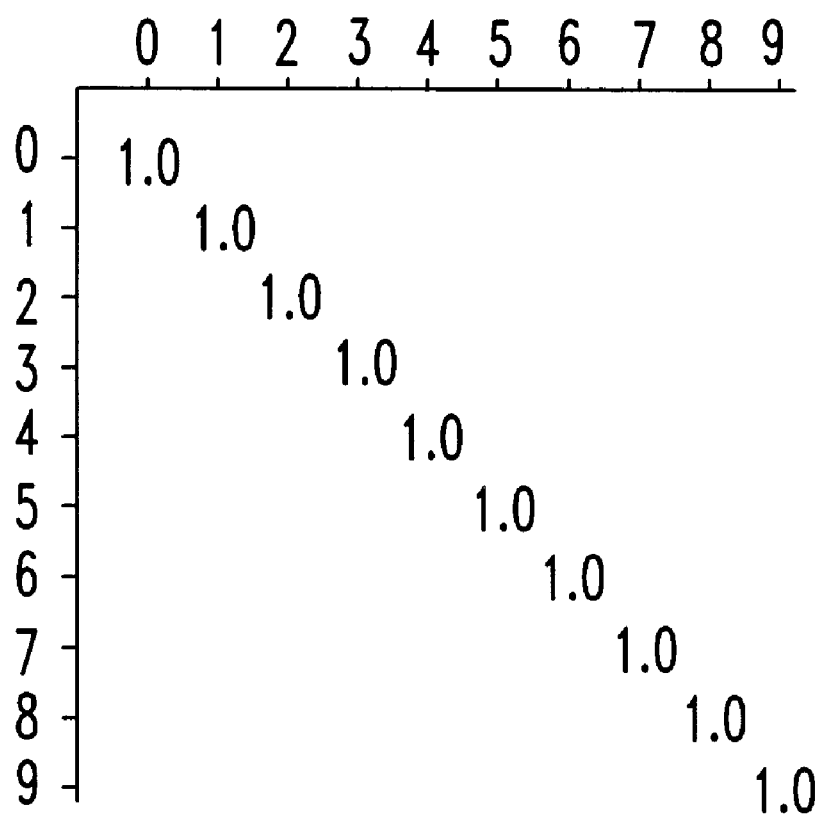
FIGS. 10($a$) and 10($b$) show confusion matrices used in conjunction with the system of FIG. 9.

FIG. 10(*a*) illustrates one possible confusion matrix that may be stored in confusion matrix memory 45 of system 100. The matrix shows several blocks of non-zero probabilities. For example, assuming that the intended character is a letter, pressing the key numbered "2" signifies the letters "A", "B", or "C". Since pressing this key may signify any of these letters, each letter has a 33% chance that it has been recognized correctly by recognizer 130. For keys "7" and "9", each of which corresponds to 4 letters, each of these letter has a the probability of 25% that it has been recognized correctly.

FIG. 10(*b*) shows the confusion matrix for the numeric characters. Since each key on the keypad is assigned to only one number, there is a 100% chance that the touch-tone recognition system 100 will correctly recognize the number that was input into the system by the user.

When the system of FIG. 9 is in operation, a user would enter an identifier through touch-tone input device 115. The identifier in this system may be defined according to the same grammar as the identifiers used in the system of FIG. 1. Touch-tone recognizer 130 would supply to processor 40 a string of alphanumeric character that purports to match the one supplied by the user. Processor 40 would verify the accuracy of this recognized identifier in the same way as the system of FIG. 1: by calculating for each reference identifier stored in database 35 a particular identifier recognition probability based on the recognized identifier and selecting from these reference identifiers the identifier most likely matching the input identifier. The selection of the closest reference identifier may be based, for example, on the reference identifier corresponding to the highest identifier recognition probability. Furthermore, the procedures outlined in FIGS. 5–7, along with the grammar constraining procedure described with respect to FIGS. 8(*a*) and 8(*b*), are capable of being implemented in the system of FIG. 9, the only difference being that the system of FIG. 9 requires a user to enter an identifier through a touch-tone telephone keypad.

The speech recognition system of the present invention is not limited to accessing account information over a telephone, but instead may be applied to a wide variety of environments that require the validation of a user's identity or that require a user to identify a particular feature or service associated with the system. For example, the present invention may be implemented in a security system intended to limit access to a facility to only those persons that speak a valid identifier into a microphone installed at an entrance of the facility. Another possible implementation for the present invention is at a remote point-of-sale terminal or a remote money-access station, in which a customer's PIN number would be entered vocally through a microphone. Furthermore, each of the items stored in database 35 may be configured to identify a particular product or service that a user desires to purchase. Thus, in this configuration, a user calling a catalog retailer may identify each product that is to be purchased by a particular alphanumeric, numeric, or alphabetical code associated with that product. After a user speaks such a product identification code into the telephone, the system of FIG. 1 would perform the speech recognition described above to correctly identify the desired product or service.

What is claimed is:

1. A method of recognizing an identifier entered by a user, the identifier including a first plurality of predetermined characters, wherein the characters are selected from a first set of characters, the first set of characters having a first total number of characters, the method comprising the steps of:
   a) providing a recognized identifier based on the entered identifier, the recognized identifier comprising a second plurality of predetermined characters;
   b) providing a plurality of reference identifiers, each one of the plurality of reference identifiers comprising a different plurality of predetermined characters, each one of the different plurality of predetermined characters belonging to the first set of characters;
   c) providing a first arrangement of character recognition probabilities, the first arrangement of character recognition probabilities encompassing a second set of characters having a second total number of characters and is a superset of the characters of the first set of characters;
   d) producing a constrained arrangement of character recognition probabilities by constraining the first arrangement of character recognition probabilities to encompass a third set of characters constituting a subset of the second set of characters;
   e) obtaining, for each character position in at least one of the reference identifiers and each character position in the recognized identifier, from the constrained arrangement of character recognition probabilities, a probability that a character in the at least one reference identifier is recognized as a character found in the corresponding character position in the recognized identifier;
   f) determining an identifier recognition probability based on the obtained probabilities;
   g) repeating steps e) and f) for every reference identifier in the plurality of reference identifiers, each one of the plurality of reference identifiers being associated with a corresponding identifier recognition probability; and
   h) selecting the reference identifier most likely matching the entered identifier based on the plurality of obtained recognition probabilities.

2. The method according to claim 1, wherein each one of the entered identifier, the recognized identifier, and the plurality of reference identifiers comprises a plurality of alphanumeric characters.

3. The method according to claim 1, wherein each one of the entered identifier, the recognized identifier, and the plurality of reference identifiers comprises a plurality of numbers.

4. The method according to claim 1, wherein each one of the entered identifier, the recognized identifier, and the plurality of reference identifiers comprises a plurality of alphabetical letters.

5. The method according to claim 1, wherein the reference identifier selected in step h) corresponds to the highest identifier recognition probability.

6. The method according to claim 1, wherein the first arrangement of character recognition probabilities and the constrained arrangement of character recognition probabilities are each obtained from an external storage medium.

7. The method according to claim 1, wherein the first arrangement of character recognition probabilities and the constrained arrangement of character recognition probabilities are each obtained from a data input device.

8. The method according to claim 1, wherein the first arrangement of character recognition probabilities and the constrained arrangement of character recognition probabilities are each obtained from a memory device.

9. The method according to claim 1, wherein the step d) of providing a constrained arrangement of character recognition probabilities comprises eliminating from consideration at least one character from the first arrangement of character recognition probabilities.

10. The method according to claim 1, wherein the first arrangement of character recognition probabilities and the constrained arrangement of character recognition probabilities are each arranged as at least one confusion matrix.

11. The method according to claim 10, wherein the at least one confusion matrix corresponds to a plurality of confusion matrices including at least one confusion matrix corresponding to alphabetical letters only, at least one confusion matrix corresponding to numbers only, and at least one confusion matrix corresponding to a combination of alphabetical letters and numbers.

12. The method according to claim 1, wherein the entered identifier is entered by the user speaking the identifier into a voice input device.

13. The method according to claim 12, wherein the recognized identifier is provided by a speech recognizer.

14. The method according to claim 1, wherein the entered identifier is entered by the user through a touch-tone input device.

15. The method according to claim 14, wherein the recognized identifier is provided by a touch-tone recognizer.

16. The method according to claim 1, further comprising the steps of:
   i) prompting the user to indicate whether the selected reference identifier matches the entered identifier;
   j) if the user indicates that the selected reference identifier matches the entered identifier, acknowledging the user as having entered a valid identifier;
   k) if the user indicates that the selected reference identifier does not match the entered identifier:
      l) providing a second plurality of reference identifiers, the second plurality of reference identifiers including every reference identifier except the selected reference identifier;
      m) repeating steps e) and f) for every reference identifier included in the second plurality of reference identifiers, each one of the reference identifiers of the second plurality of reference identifiers being associated with a second corresponding identifier recognition probability; and
      n) selecting from the second plurality of reference identifiers the reference identifier most likely matching the entered identifier based on the second corresponding identifier recognition probabilities.

17. The method according to claim 16, wherein the reference identifier selected in step n) corresponds to the highest identifier recognition probability of the second corresponding identifier recognition probabilities.

18. The method according to claim 16, further comprising the steps of:
   o) prompting the user to indicate whether the reference identifier selected in step n) matches the entered identifier;
   p) if the user indicates that the reference identifier selected in step n) matches the entered identifier, acknowledging the user as having entered a valid identifier;
   q) if the user indicates that the reference identifier selected in step n) does not match the reference identifier selected in step n):

r) reinstating the reference identifier selected in step h) into a third plurality of reference identifiers, the third plurality of reference identifiers firther including every other reference identifier except for the reference identifier selected in step n);

s) repeating steps e) and f) for every reference identifier included in the third plurality of reference identifiers, every reference identifier in the third plurality of reference identifiers being associated with a new corresponding identifier recognition probability; and t) selecting from the third plurality of reference identifiers the reference identifier most likely matching the entered identifier based on the new corresponding identifier recognition probabilities.

19. The method according to claim 18, wherein the reference identifier selected in step t) corresponds to the highest recognition probability of the new corresponding identifier recognition probabilities.

20. The method according to claim 1, wherein before the selecting step h), the method further comprises the step of determining a subset of the plurality of reference identifiers, each of the reference identifiers included in the subset corresponding to an identifier recognition probability higher than a predetermined threshold, wherein the reference identifier selected in step h) is selected from the subset of the plurality of reference identifiers.

21. The method according to claim 20, further comprising the steps of:

i) prompting the user to indicate whether the reference identifier selected in step h) matches the entered identifier;

j) if the user indicates that the selected reference identifier matches the entered identifier, acknowledging that the user has entered a valid identifier;

k) if the user indicates that the selected reference identifier does not match the entered identifier:

l) selecting the reference identifier corresponding to the next highest identifier recognition probability within the subset of the plurality of reference identifiers;

m) prompting the user to indicate whether the reference identifier selected in step l) corresponds to the entered identifier;

n) if the user indicates that the reference identifier selected in step l) matches the entered identifier, acknowledging that the user has entered a valid identifier;

o) if the user indicates that the reference identifier selected in step l) does not match the entered identifier, repeating steps l) through n) in accordance with the reference identifiers included in the subset of the plurality of reference identifiers.

22. An apparatus for recognizing an identifier entered by a user, the entered identifier including a first plurality of predetermined characters, wherein the characters are selected from a first set of characters, the first set of characters including a first total number of characters, the system comprising:

means for receiving a recognized identifier based on the entered identifier, the recognized identifier comprising a second plurality of predetermined characters;

a first memory that stores a plurality of reference identifiers, each one of the reference identifiers comprising a different plurality of predetermined characters, each one of the different plurality of predetermined characters belonging to the first set of characters;

a second memory that stores a first arrangement of character recognition probabilities, the first arrangement of character recognition probabilities encompassing a second set of characters having a second total number of characters and is a superset of the characters of the first set of characters, each of the character recognition probabilities representing a probability that a certain recognized character corresponds to a certain entered character; and a third memory that stores constraint data; and a processor, in communication with the means for receiving, the first memory, the second memory, and the third memory, that produces in accordance with the constraint data of the third memory a constrained arrangement of character recognition probabilities, the constrained arrangement of character recognition probabilities being produced by constraining the first arrangement of character recognition probabilities to encompass a third set of characters constituting a subset of the second set of characters, the processor determining for every one of the plurality of reference identifiers a corresponding identifier recognition probability, each of the corresponding identifier recognition probabilities being determined on the basis of the constrained arrangement of character recognition probabilities, the processor selecting the reference identifier most likely matching the entered identifier based on the identifier recognition probabilities.

23. The apparatus according to claim 22, wherein the selected reference identifier corresponds to the highest identifier recognition probability.

24. The apparatus according to claim 22, wherein each one of the entered identifier, the recognized identifier, and the plurality of reference identifiers comprises a plurality of alphanumeric characters.

25. The apparatus according to claim 22, wherein each one of the entered identifier, the recognized identifier, and the plurality of reference identifiers comprises a plurality of numbers.

26. The apparatus according to claim 22, wherein each one of the entered identifier, the recognized identifier, and the plurality of reference identifiers comprises a plurality of alphabetical letters.

27. The apparatus according to claim 22, wherein the first arrangement of character recognition probabilities and the constrained arrangement of character recognition probabilities are each arranged as at least one confusion matrix.

28. The apparatus according to claim 27, further comprising a selecting means, in communication with the processor, for selecting among the at least one confusion matrix.

29. The apparatus according to claim 27, wherein the at least one confusion matrix corresponds to a plurality of confusion matrices including at least one confusion matrix corresponding to alphabetical letters only, at least one confusion matrix corresponding to numbers only, and at least one confusion matrix corresponding to a combination of alphabetical letters and numbers.

30. In a speech recognition system for recognizing an identifier entered by a user in accordance with a constrained arrangement of character recognition probabilities, the identifier comprising a first plurality of predetermined characters, wherein the characters are selected from a first set of characters, the first set of characters including a first total number of characters, a method of producing the constrained arrangement of character recognition probabilities, comprising:

a) providing a first arrangement of character recognition probabilities, the first arrangement of character recognition probabilities encompassing a second set of characters having a second total number of characters and is a superset of the characters of the first set of characters; and b) producing the constrained arrangement of character recognition probabilities by constraining the first arrangement of character recognition probabilities to encompass a third set of characters constituting a subset of the second set of characters, wherein each character recognition probability represents a probability that a first character entered by the user will be recognized as one of the first character and a second character.

31. The method according to claim 30, where in the step b) of providing a constrained arrangement of character recognition probabilities comprises eliminating from consideration at least one character from the first arrangement of character recognition probabilities.

* * * * *